No. 669,890. Patented Mar. 12, 1901.
W. A. H. BOGARDUS.
CARRIER FOR TUBULAR DESPATCH SYSTEMS.
(Application filed Aug. 10, 1900.)
(No Model.)
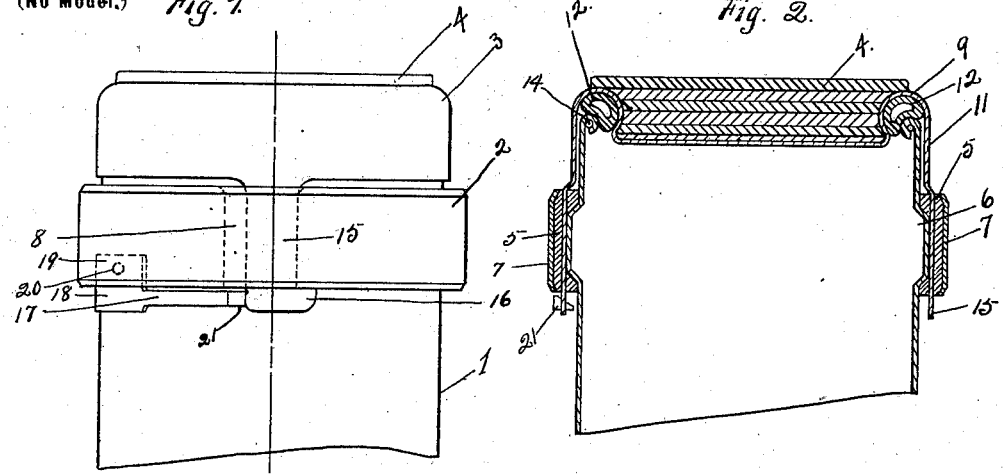
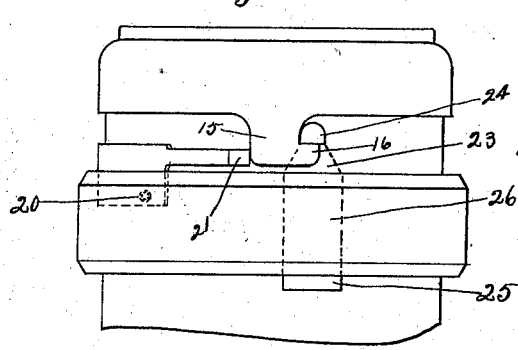
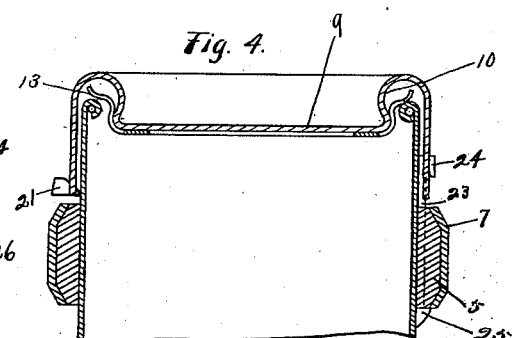
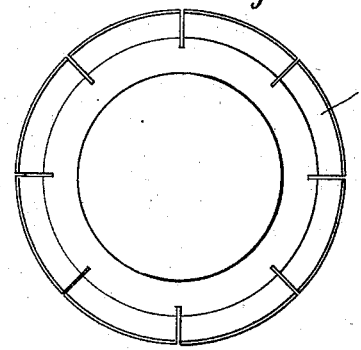
WITNESSES:
George. G. Powell.
Jos H Blackwood
Washington A. H. Bogardus.
INVENTOR
BY
ATTORNEY
THE NORRIS PETERS CO., PHOTO-LITHO., WASHINGTON, D. C.

UNITED STATES PATENT OFFICE.

WASHINGTON A. H. BOGARDUS, OF NEW YORK, N. Y.

CARRIER FOR TUBULAR DESPATCH SYSTEMS.

SPECIFICATION forming part of Letters Patent No. 669,890, dated March 12, 1901.

Application filed August 10, 1900. Serial No. 26,494. (No model.)

*To all whom it may concern:*

Be it known that I, WASHINGTON A. H. BOGARDUS, a citizen of the United States, residing at "The Montana," One Hundred and Twenty-fourth street and Mount Morris avenue, in the city of New York, county of New York, and State of New York, have invented a new and useful Improvement in Carriers for Tubular Despatch Systems, of which the following is a specification.

My invention relates to improvements in the general class of pneumatic-despatch apparatus, and more particularly to an improved carrier for pneumatic-tube systems, its objects being to provide a simpler, more efficient, and stronger carrier than has heretofore been in use, and especially to provide improved means of securely attaching and locking the cap, means to prevent the insertion of the carrier into the tube before it is securely locked, means to prevent the detachment of the cap while the carrier is in the tube, and the elimination, as far as possible, of bolts and rivets in the construction of such a carrier. I attain these objects in the manner hereinafter set forth, reference being had to the accompanying drawings, in which—

Figure 1 is an elevational view of an end portion of my carrier; Fig. 2, a longitudinal section thereof; Fig. 3, an elevational view of a modification; Fig. 4, a longitudinal section of Fig. 3; Fig. 5, an end view of carrier, showing cap removed; and Fig. 6, a detail plan of split spring-ring.

Like reference characters designate similar parts throughout the several views.

Referring to the drawings, 1 represents the body of the carrier; 2, a packing-ring thereon; 3, the cap, and 4 a buffer in said cap.

The body 1 of the carrier is preferably stamped or otherwise formed from steel or other suitable material in the form of a hollow cylinder closed at one end. Two or more packing-rings 2, consisting of a metallic ring or felly 5, preferably provided with one or more internal annular recesses 6 and covered with a layer or layers 7 of any suitable packing material, such as vulcanized rubber and fiber, are placed upon the body 1 of the carrier at suitable intervals. An expanding roll is then inserted in the body 1 and the walls thereof rolled into the recess 6 of the rings 5, and the walls of the body 1 and rings 2 sweated together by the insertion between them of a metallic cement and the application of heat. However, the recesses 6 and expanding of the body 1 may be dispensed with and the rings 5 soldered or brazed directly to the walls of body 1. Transverse recesses 8 are provided through the upper ring 5 of a carrier.

The cap 3 is formed with a flat or slightly-arched top portion 9, and a recess 10 of substantially tubular form and open upon its lower side is formed between the top portion 9 and the side walls 11 of the cap. Within this recess 10 is placed an elastic seal 12, preferably taking the form of an ordinary hollow inflated pneumatic tire calculated to make the carrier water-tight. When it is not desired to provide a water-tight carrier, a split spring-ring 13 (shown in detail in Fig. 6 and also in Fig. 3) may be used, attached in any suitable manner to the top portion 9 of the cap 3. The top edge of the body 1 of the carrier is preferably turned to form a wired bead 14, which is designed to form a seat for the seal 12 of the cap 3. The wall 11 of the cap is extended in two or more places to form legs 15, having hooked ends 16 and adapted to pass through the recesses 8 of the upper ring 5 and their hooked ends 16 designed to engage the lower edge of the ring 5 when the cap 3 is rotated in this position on the body 1. A spring 17, lying substantially parallel to ring 5 and having one end 18 seated in a recess 19 in the ring 5, is secured therein by the ring-securing means and a set-screw 20. The free end of spring 17 is provided with an enlarged portion 21, beveled on its upper inner edge to ride up on the leg 15 and its end squared to fall behind a low leg 15 when the cap has been rotated until hooked end 16 engages the under side of ring 5, thereby positively securing the carrier from coming open. The enlarged portion 21 of the spring 17 is of a thickness sufficient to just clear inside of the packing-ring when the carrier is locked and the spring has fallen behind leg 15, but will project beyond the ring 5 and prevent the carrier from being inserted in the tube when the spring is not so far behind the leg, but bears upon the outer surface of the leg, the carrier not being securely locked. A buffer 4, consisting of several layers of leather cemented or strapped together or of other material, is sprung into place between the flanges formed by the recess 10, being stamped or rolled up and cemented or otherwise fastened to the top portion 9 of the cap 3. It will be seen that this construction of the cap produces a tighter joint at the seal, as more pressure is brought to bear upon the top portion 9 of the cap.

In the modification shown in Fig. 3 the spring 17 is fastened above the ring 5, and straps 23, carrying lugs 24 and retain-angles 25, secured in recess 26 of ring 5, are substituted for the recesses 8 in Fig. 1, the legs 15 being shortened, their hooked ends 16 engaging legs 24, inside of ring 5, directly upon the cap being rotated.

To apply the cap to a carrier, it is placed upon the body portion 1 and the legs inserted in recesses 8, then pressed down, the beaded edge 14 of the body engaging the seal 12 until the hooked ends 16 clear the ring 5, thereby rendering the carrier water-tight, and the spring 17, by reason of its beveled inner edge, has ridden up upon the leg 15. Then the cap is rotated in the direction of the hook 16 until said hooks have passed under the solid portion of the ring and the springs 17 have fallen behind legs 15, locking the cap in place. To open the carrier, a pointed instrument of any suitable shape is applied under spring 17 and the said spring raised, allowing the hooked portion 16 to be rotated from under the solid portion of the ring, and the cap removed.

It is obvious that various changes may be made in the construction and detail of this device without departing from the spirit of my invention.

Having now described my invention, what I claim, and desire to secure by Letters Patent, is—

1. In a carrier for pneumatic transit-tube systems, a body portion, a lid therefor, a plurality of arms upon said lid extending longitudinally of said carrier, hooked ends for said arms, projections upon said body portion for engaging said hooked ends and a latch on said body portion for locking said hooked arms in engagement with said projections, substantially as described.

2. In a carrier for pneumatic transit-tube systems, a body portion, a lid therefor, a plurality of arms upon said lid extending longitudinally of said carrier, hooked ends for said arms, projections upon said body portion for engaging said hooked arms, and a latch for locking said hooked arms in engagement with said projections, said latch of such thickness as to project beyond the extreme outer periphery of the carrier when said hooked arms are not securely locked but to lie within said outer periphery when said arms are securely locked, substantially as described.

3. In a carrier for pneumatic transit-tube systems, a body portion and a lid therefor adapted to interlock on being rotated and a latch for locking said body portion and lid in said interlocked position, said latch of such thickness as to project beyond the extreme outer periphery of the carrier when said body portion and lid are not securely locked but fall within said outer periphery when in its locking position, substantially as described.

4. In a carrier for pneumatic transit-tube systems, a body portion, a lid therefor, hooked arms on said lid extending longitudinally of the carrier, projections upon said body portion with which said hooked arms are adapted to engage upon a slight rotation of the lid, a latch on said body portion having a beveled edge allowing said hooked arm to pass under and raise said latch when the lid is applied, said latch of such thickness as to extend beyond the extreme outer periphery of the carrier when in such raised position, said latch adapted to fall behind and lock said hooked arms and pass entirely within said outer periphery of the carrier when said arms shall have engaged said projections through the slight rotation of the lid, substantially as described.

5. In a carrier for pneumatic transit-tube systems, a body portion, a packing-ring thereon comprising a metallic ring provided upon its outer periphery with a layer or layers of packing material, substantially as described.

6. In a carrier for pneumatic transit-tube systems, a body portion, a packing-ring thereon comprising a metallic ring having an annular recess or groove in its inner periphery, the walls of said body portion protruding within said annular recess and packing material disposed upon the outer periphery of said ring, substantially as described.

7. In a carrier for pneumatic transit-tube systems, a body portion, a packing-ring thereon comprising a metallic ring secured to said body portion and having a layer or layers of packing material disposed upon its outer periphery, transverse slots or openings through said metallic ring, a lid for said body portion having hooked arms adapted to pass through said transverse openings, the hooked portions of said arms adapted to engage said ring upon a slight rotation of the lid, and latches disposed opposite said openings having a beveled under edge and adapted to ride over said arms when the latter are inserted in the said transverse openings and fall behind and lock said arms when the latter are rotated with the lid and the hooked portion thereof has engaged said ring, substantially as described.

8. In a carrier for pneumatic transit-tube systems, a body portion, a cap therefor having a top portion, an annular recess opening into said cap between said top portion and the walls of the cap, an elastic tube in said recess, and a fluid contained under pressure within and distending said tube, substantially as described.

9. In a carrier for pneumatic transit-tube systems, a body portion and a lid therefor comprising a top portion, an annular recess opening into said lid between said top portion and the walls of said lid, an elastic seal within said recess adapted to bear upon said body portion, said seal consisting of an elastic tube and a fluid contained under pressure within and distending said tube, substantially as described.

10. In a carrier for pneumatic transit-tube systems, a body portion, a lid therefor having a top portion and an annular recess opening into said lid between said top portion and the wall of said lid, said recess being approximately tubular in form, an elastic seal within said recess of approximately cylindrical form adapted to bear upon said body portion, and consisting of an elastic tube and a fluid contained under pressure within and distending said tube, substantially as described.

11. In a carrier for pneumatic transit-tube systems, a body portion, a lid therefor having a top portion and walls perpendicular thereto, said top portion struck up adjacent said walls to form an approximately tubular recess opening into said lid and a cylindrical space above said top portion, a buffer of leather or other suitable material disposed within said cylindrical space, and an elastic seal disposed within said tubular recess consisting of an inflated tube of rubber or other suitable material adapted to bear upon the said body portion, substantially as described.

In testimony whereof I have signed my name to this specification in the presence of two subscribing witnesses.

WASHINGTON A. H. BOGARDUS.

Witnesses:
GEORGE E. PHELPS,
GEORGE G. POWELL.